(12) United States Patent
Wang et al.

(10) Patent No.: US 8,532,169 B2
(45) Date of Patent: Sep. 10, 2013

(54) RATE CONTROL FOR TWO-PASS ENCODER USING ADAPTIVE QUANTIZATION PARAMETERS

(75) Inventors: Limin Wang, San Diego, CA (US); Yinqing Zhao, Palo Alto, CA (US)

(73) Assignee: General Instrument Corporation, Horsham, PA (US)

( * ) Notice: Subject to any disclaimer, the term of this patent is extended or adjusted under 35 U.S.C. 154(b) by 699 days.

(21) Appl. No.: 12/645,702

(22) Filed: Dec. 23, 2009

(65) Prior Publication Data

US 2011/0150076 A1 Jun. 23, 2011

(51) Int. Cl.
*H04N 11/02* (2006.01)

(52) U.S. Cl.
USPC .............. 375/240; 375/240.03; 375/240.04; 375/240.14; 375/240.16

(58) Field of Classification Search
USPC .................................. 375/240.03–240.16
See application file for complete search history.

(56) References Cited

U.S. PATENT DOCUMENTS

| | | | | |
|---|---|---|---|---|
| 5,583,573 | A * | 12/1996 | Asamura et al. ......... | 375/240.04 |
| 5,686,962 | A * | 11/1997 | Chung et al. ............. | 375/240.16 |
| 5,978,029 | A * | 11/1999 | Boice et al. ............... | 375/240.14 |
| 6,067,118 | A * | 5/2000 | Chen et al. ................ | 375/240.03 |
| 8,107,537 | B2 * | 1/2012 | Zhou et al. ................ | 375/240.25 |
| 2002/0114393 | A1 * | 8/2002 | Vleeschouwer ......... | 375/240.16 |
| 2002/0131494 | A1 * | 9/2002 | Fukuda et al. ............ | 375/240.03 |
| 2008/0212677 | A1 * | 9/2008 | Chen et al. ................ | 375/240.16 |

OTHER PUBLICATIONS

ProQuest_NPL_search_history.*

* cited by examiner

*Primary Examiner* — William C Vaughn, Jr.
*Assistant Examiner* — Luis M Perez
(74) *Attorney, Agent, or Firm* — Thomas A. Ward (57) ABSTRACT

A two-pass encoder determines a quantization parameter (QP) value to control an actual number of bits consumed in a second encoding pass. The two-pass encoder includes a first encoding module, a rate control module and a second encoding module. The first encoding module includes a circuit configured to perform a first encoding pass to encode input video sequences. The rate control module is configured to determine R, a target bit rate for a picture in the second encoding pass, and $\alpha$, a variable dependent on a QP value range, a picture type, and complexity. Q, a QP value for the picture or an MB of the picture in the second encoding pass, is also determined based on R and $\alpha$. The second encoding module is configured to use Q to encode the picture or the MB of the picture in the input video sequence in the second encoding pass to form an output bitstream. The rate control module is further configured to update $\alpha$ to encode a next picture or a next MB of the picture in the second encoding pass.

20 Claims, 9 Drawing Sheets

RATE CONTROL FOR TWO-PASS ENCODER USING ADAPTIVE QUANTIZATION PARAMETERS

BACKGROUND

ITU-T H.264/MPEG-4 part 10 is a recent international video coding standard, developed by Joint Video Team (JVT) formed from experts of International Telecommunications Union Telecommunication Standardization Sector (ITU-T) Video Coding Experts Group (VCEG) and International Organization for Standardization (ISO) Moving Picture Experts Group (MPEG). ITU-T H.264/MPEG-4 part 10 is also referred to as MPEG-4 AVC (Advanced Video Coding). MPEG-4 AVC achieves data compression by utilizing the advanced coding tools, such as spatial and temporal prediction, blocks of variable sizes, multiple references, integer transform blended with quantization operation, entropy coding, etc. MPEG-4 AVC supports adaptive frame and field coding at picture level. MPEG-4 AVC is able to encode pictures at lower bit rates than older standards but maintain at least the same quality of the picture.

Rate control is an engine that dynamically adjusts encoding parameters so that the resulting compressed bit rate can meet a target bit rate. Rate control is important to regulate the encoded bit stream to satisfy the channel condition and to enhance the reconstructed video quality. However, in actuality, single-pass rate control for an MPEG-4 AVC often results in uneven quality within a picture as well as from picture to picture. For example, there may be serious pulsing problems around instantaneous decoding refresh (IDR) picture of MPEG-4 AVC with single-pass rate control. Many of the causes of the uneven quality result from the inability to accurately estimate a target bit rate for future pictures that have yet to be encoded in the stream.

Additionally, in instances where a target bit rate is estimated, a further difficulty may arise in controlling the actual bit rate to achieve the target bit rate. The inability to control the bit rate may affect buffers in encoders used to encode the bit stream.

SUMMARY

Disclosed herein is a two-pass encoder configured to determine a quantization parameter (QP) value to control an actual number of bits consumed in a second encoding pass, according to an embodiment. The two-pass encoder includes a first encoding module, a rate control module and a second encoding module. The first encoding module includes a circuit configured to perform a first encoding pass to encode input video sequences. The rate control module is configured to determine R. R is a target bit rate for a picture in the second encoding pass. The rate control module may determine Q using an adaptive Q-R model to achieve R. Q is a QP value for the picture in the second encoding pass. In the Q-R model, the rate control module uses a control variable $\alpha$, which is dependent on a QP value range, a picture type, and complexity. The second encoding module is configured to use Q to encode the picture in the input video sequence in the second encoding pass to form an output bitstream. The rate control module is further configured to update $\alpha$ to encode a next picture in the second encoding pass.

Also disclosed herein is a method of determining a QP value for a macroblock (MB) within a picture to control an actual number of bits consumed in a second encoding pass of a two-pass encoder, according to an embodiment. In the method, R, a target bit rate for the picture in the second encoding pass, is determined. Q, a QP value for the MB of the picture in the second encoding pass, is determined. The QP value may be determined using a virtual buffer model or an adaptive Q-R model. In the virtual buffer model, the virtual buffer may be an actual buffer storing the encoded output bitstream as it is being transmitted on a channel to other devices or the virtual buffer may be an assigned portion of a buffer. $\alpha$, a control variable dependent on a QP range, a picture type, and complexity is used in the adaptive Q-R model. Q is used to encode the MB of the picture in the second encoding pass to form an output bitstream. Thereafter, the virtual buffer fullness or the $\alpha$ value is updated to encode a next MB of the picture in the second encoding pass.

Further disclosed is a computer readable storage medium on which is embedded one or more computer programs implementing the above-disclosed method of determining a QP value to control an actual number of bits consumed in a second encoding pass of a two-pass encoder, according to an embodiment.

As described above, the embodiments utilize a two-pass encoder, and rate control is achieved by adjusting a QP value so that an actual rate is approximately equal to the target bit rate for encoding the pictures in the second encoding pass. The QP value may be adjusted at a picture level or an MB level. Further, the QP value may be adjusted so that an actual bit rate closely approximates a target bit rate. Alternately, the QP value may be adjusted to constrain a bit rate based on a virtual buffer fullness.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

1. Functional Diagram of Two-Pass Encoder

Figure 1:
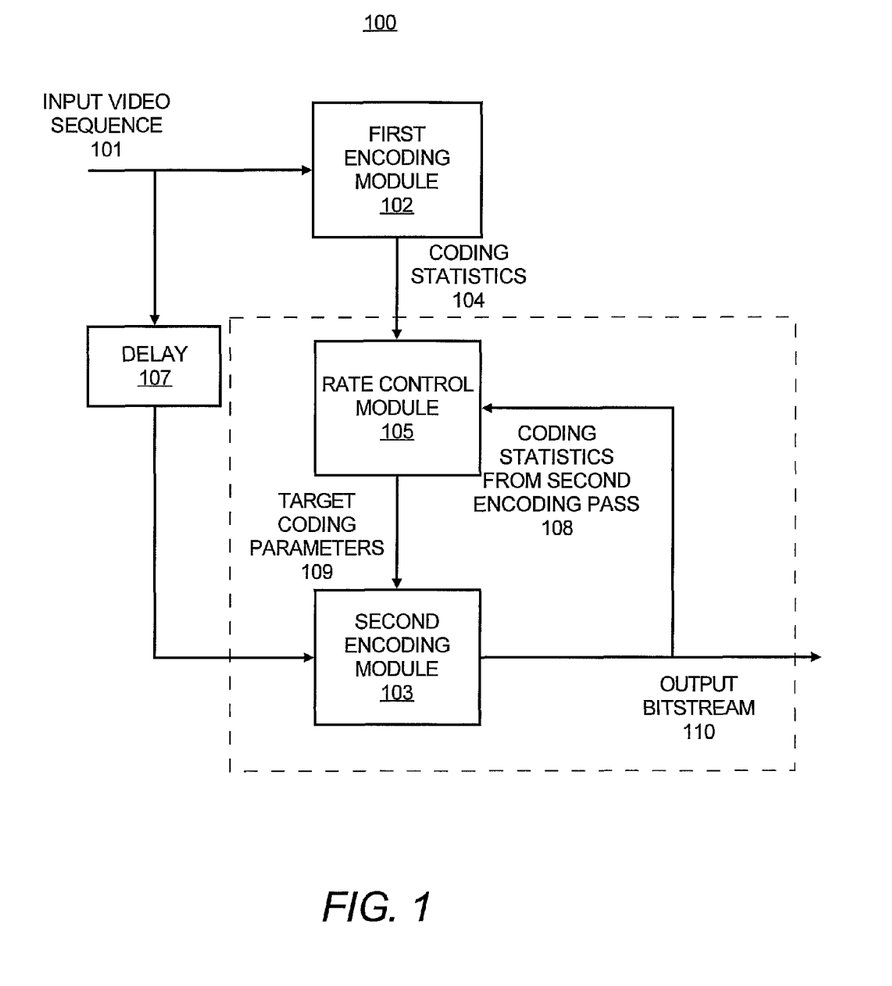
FIG. 1 illustrates a functional block diagram of a two-pass encoder, according to an embodiment.

FIG. 1 illustrates a functional block diagram of a two-pass MPEG-4 AVC encoder 100 configured to determine a quantization parameter (QP) to control an actual number of bits consumed in a second encoding pass. The two-pass MPEG-4 AVC encoder 100 receives an input video sequence 101, a sequence of pictures in which each picture is one of an I, P, $B_s$, or B picture in field or frame. As shown in FIG. 1, a first encoding module 102 and a second encoding module 103 receive the same input video sequence 101 with a delay 107 between a first encoding pass at the first encoding module 102 and the second encoding pass at the second encoding module 103. The first encoding pass is performed at either variable bit rate (VBR) or constant bit rate (CBR).

The rate control module 105 determines R for a picture in the second encoding pass using the coding statistics from the first encoding pass. R is a target bit rate for the picture in the second encoding pass. The rate control module 105 may determine Q for the picture in the second encoding pass in order to achieve the target rate R. Q is a QP value for the picture in the second encoding pass. The rate control module 105 may determine Q using an adaptive Q-R model, in which is a control parameter, α, dependent on a QP value range, a picture type, and complexity. The second encoding module 103 is configured to use Q to encode the picture in the input video sequence 101 in the second encoding pass to form an output bitstream 110. The rate control module 105 thereafter updates α to encode a next picture in the second encoding pass as further described below.

Alternatively, the rate control module 105 may control the rate of the output bitstream 110 by adjusting the QP value per MB within a picture to achieve the target rate R. The rate control module 105 may adjust the QP value per MB of the picture using a virtual buffer (not shown). The virtual buffer may be an actual buffer storing the encoded output bitstream as it is being transmitted on a channel to other devices or the virtual buffer may be an assigned portion of a buffer. The rate control module 105 may adjust the QP value per MB of the picture using an adaptive Q-R model at MB level.

The two-pass MPEG-4 AVC encoder 100 includes a hardware, such as a processor or other circuit for encoding. It should be understood that the two-pass MPEG-4 AVC encoder 100 depicted in FIG. 1 may include additional components and that some of the components described herein may be removed and/or modified without departing from a scope of the two-pass MPEG-4 AVC encoder 100. Although the two-pass MPEG-4 AVC encoder 100 is described with respect to MPEG-4 AVC, it should be apparent that embodiments of the invention may be used with different video coding standards.

According to an embodiment, the first encoding module 102 and the second encoding module 103 are configured as partial encoders. In the two-pass MPEG-4 AVC encoder 100, motion estimation (ME), which is the most time consuming task in an MPEG-4 AVC encoder, and code mode selection are not duplicated in the first encoding module 102 and the second encoding module 103. Instead, tasks are shared by the first encoding module 102 and the second encoding module 103. For instance, the first encoding module 102 may perform ME at full-pel resolution to form full-pel motion vectors (MVs) with associated reference indexes (refIdx) and eliminate a large number of possible code modes per MB to form a limited number of candidate code modes. The second encoding module 103 may thereafter refine the full-pel MVs at quarter-pel resolution and select a final code mode from among the limited number of candidate code modes.

The first encoding pass and the second encoding pass are performed approximately in parallel with an offset provided by the delay 107. The coding statistics 104 from the first encoding pass may thereby be used in the second encoding pass. The first encoding pass is ahead of the second encoding pass by an approximately constant number of pictures, for example, the delay 107 may be 30 pictures. The delay 107 may also be measured in time, for instance 1 second. Because the first encoding pass is ahead of the second encoding pass, the first encoding pass may provide the coding statistics 104 for the second encoding pass before the second encoding module 103 starts to process the pictures. This includes sending the coding statistics from the first encoding pass to the rate control module 105 of the second encoding module 103 to be used in the second encoding pass to generate target coding parameters 109 which are thereafter used in the second encoding pass.

The rate control module 105 receives the coding statistics 104 from the first encoding module 102. The coding statistics 104 include, for instance, QPs, and a number of bits generated for each picture in the first encoding pass. The rate control module 105 is configured to generate the target coding parameters 109 using the coding statistics 104. The target coding parameters 109 include, for instance, $R_{two,Ff,picType}(i)$, a target number of bits for each picture i in the second encoding pass, a target number of bits budgeted for a group of pictures (GoP) in the second encoding pass, and QP(s). The rate control module 105 is configured to control an actual number of bits consumed for picture i to approximate $R_{two,Ff,picType}(i)$. The rate control module 105 may control the actual number of bits by adjusting the QP value at either picture level as shown with respect to FIGS. 2 to 4 and the methods 200 and 210 hereinbelow or at MB level as shown with respect to FIGS. 5 to 6 and the methods 230 and 240 hereinbelow. The rate control module 105 then sends the target coding parameters 109 to the second encoding module 103.

The second encoding module 103 encodes the input video sequence 101 using the target coding parameters 109 and coding information, such as MVs and associated refIdx and candidate code modes per MB, from the first encoding pass 104. The second encoding module 103 then outputs an output bitstream 110. The rate control module 105 also updates α to encode a next picture or next MB in the second encoding pass.

2. Adjusting Quantization Parameters for Rate Control in the Two-Pass MPEG-4 AVC Encoder Examples of methods in which the two-pass MPEG-4 AVC encoder 100 may be employed to control an actual number of bits consumed in a second encoding pass are now described with respect to the following flow diagrams of the methods 200-250 depicted in FIGS. 2-7. It should be apparent to those of ordinary skill in the art that the methods 200-250 represent generalized illustrations and that other steps may be added or existing steps may be removed, modified or rearranged without departing from the scopes of the methods 200-250. In addition, the methods 200-250 are described with respect to the two-pass MPEG-4 AVC encoder 100 by way of example and not limitation, and the methods 200-250 may be used in other systems. Also, the methods and system described herein are described with respect to encoding input video sequences using MPEG-4 AVC by way of example. The methods and systems may be used to encode input video sequences using other types of MPEG standards or standards that are not MPEG.

Some or all of the operations set forth in the methods 200-250 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

Figure 2:
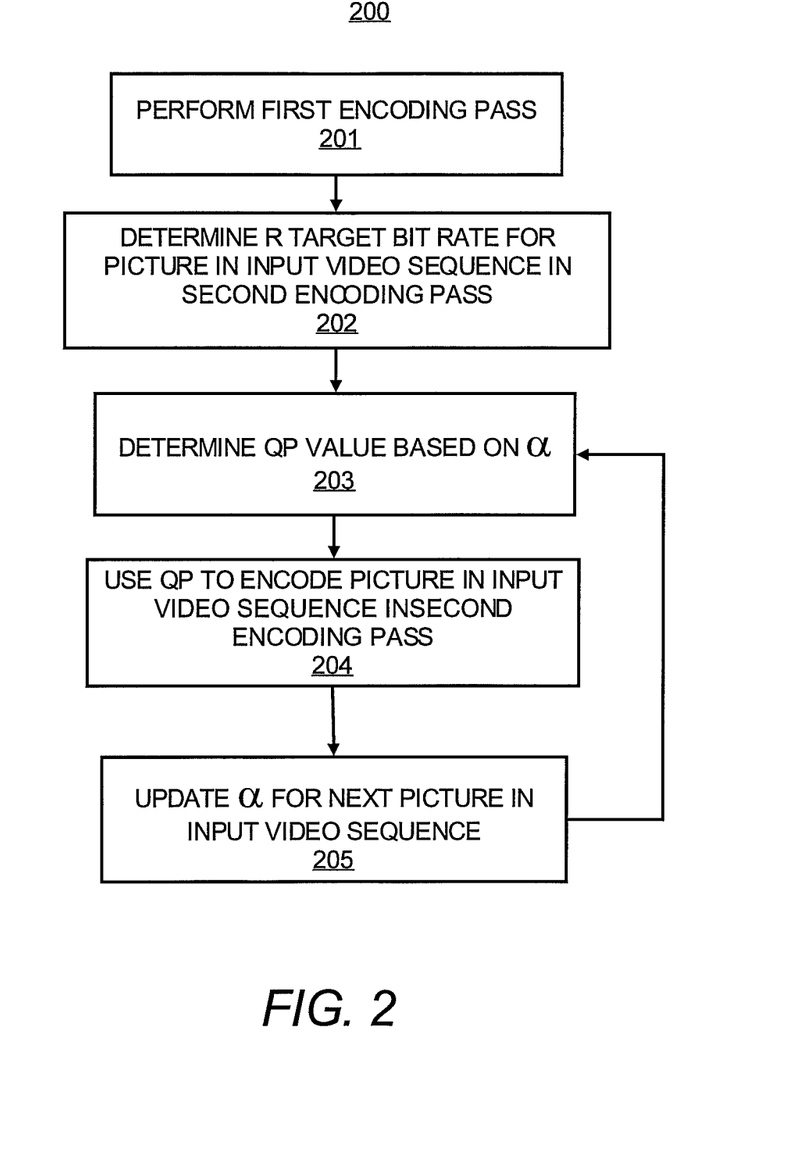
FIG. 2 illustrates a flow diagram of adjusting a quantization parameter in a two-pass encoder, according to an embodiment.

The method 200, as shown in FIG. 2, is a generalized illustration of a method of determining Q per picture i based on a Q-R model represented by an equation $$Q = -\alpha \times \log_2 R + \beta, \quad \text{Equation (1)}$$

in which $\alpha$ and $\beta$ are values adjusted for QP value ranges, for picture type, and for complexity of the picture i. $\alpha$ and $\beta$ are control variables. The picture types may include I, P, $B_s$, or B pictures, and depending on the picture type $\alpha$ and $\beta$ may be adjusted differently. Additionally, $\alpha$ and $\beta$ may be adjusted differently based on a measure of complexity of scene content in a picture, and/or based on different ranges of the QP values.

At step 201, as shown in FIG. 2, the first encoding module 102 performs a first encoding pass. The first encoding module 102 may receive the input video sequence 101 including a sequence of pictures in which each picture is one of an I, P, $B_s$, or B picture in field or frame. The first encoding module 102 encodes the input video sequence 101 and determines coding statistics 104 for the first encoding pass. The coding statistics 104 may include full-pel MVs, associated refldx's, and QPs from the first encoding pass. The first encoding module thereafter sends the coding statistics to the rate control module 105.

At step 202, the rate control module 105 determines R, a target bit rate for encoding a picture i from the input video sequence 101 in the second encoding pass. The rate control module 105 may determine R in the method 200 as $R_{two,Ff,picType}(i)$, which is the target number of bits for the picture i. For instance, the rate control module 105 may determine the target number of bits for the picture i based upon picture type of I, P, $B_s$, or B picture, and whether the picture is in frame or field (picture i of picType∈{I,P,$B_s$,B} in Ff∈{frame, field}) in the second encoding pass. The target number of bits may also be determined based upon a complexity of the picture.

At step 203, the rate control module 105 determines Q based on $R_{two,Ff,picType}(i)$ and $\alpha$. $\alpha$ is a control variable dependent on a QP value range, a picture type, and complexity. The complexity is determined for the picture i. Q is a QP value for the picture i in the second encoding pass.

According to an embodiment, the rate control module 105 applies an adaptive Q-R model to determine a QP value for the picture. A Q-R model is a state space representation of possible behaviors that may occur over time starting from an initial scenario. For instance, the rate control module 105 may use an adaptive Q-R model as determined by Equation (1) hereinabove. The application of the adaptive Q-R model to the QP in the second encoding pass may be determined as follows.

The rate control module 105 may determine a complexity of the picture using an equation $$C = R \times 2^{\frac{Q-c}{6}} \quad \text{Equation (2)}$$

in which Q is the QP value applied to the picture and R is the corresponding bits generated, and c is a constant that takes one of six values, depending upon the QP value.

Equation (2) is converted into a Q-R model using an equation $$Q = -6 \times \log_2 R + \beta. \quad \text{Equation (3)}$$

The Q-R model may be used in both the first encoding pass and the second encoding pass as shown in the following equations $$Q_{one,Ff,picType}(i) = -6 \times \log_2 R_{one,Ff,picType}(i) + \beta, \text{ and} \quad \text{Equation (4)}$$

$$Q_{two,Ff,picType}(i) = -6 \times \log_2 R_{two,Ff,picType}(i) + \beta. \quad \text{Equation (5)}$$

In which $Q_{one,Ff,picType}(i)$ and $Q_{two,Ff,picType}(i)$ are respectively the QP value for the picture i in the first encoding pass and the second encoding pass, and $R_{one,Ff,picType}(i)$ and $R_{two,Ff,picType}(i)$ are respectively the number of bits for the picture i in the first encoding pass and the second encoding pass using $Q_{one,Ff,picType}(i)$ and $Q_{two,Ff,picType}(i)$.

Further using Equations (4) and (5), for the picture i of picType∈{I,P,$B_s$,B} in Ff∈{frame, field} in the second encoding pass, given a target number of bits, $R_{two,Ff,picType}(i)$, the QP value may be determined using an equation $$Q_{two,Ff,picType}(i) = \quad \text{Equation (6)}$$

$$Q_{one,Ff,picType}(i) - 6 \times \log_2\left(\frac{R_{two,Ff,picType}(i)}{R_{one,Ff,picType}(i)}\right).$$

Equation (6) gives a global (or average) QP for the picture i of picType∈{I,P,$B_s$,B} in Ff∈{frame, field}, with which the number of bits generated for the picture i by the second encoding module 103 may approximate the target number of bits for the picture i, $R_{two,Ff,picType}(i)$.

Equation (3) is an approximate Q-R model per picture. In test cases, with use of the QP value determined using Equation (6) which is determined based upon Equation (3), an actual bits generated from the second encoding pass has been observed to diverge from the target number of bits, $R_{two,Ff,picType}(i)$. A fixed Q-R model, such as Equation (3), is not able to cover entire QP ranges, all picture types, and all pictures of varying complexity to an acceptable approximation.

However, a relationship between Q and R may be modeled to an adaptive approximation using Equation (1) as shown hereinabove. With the Q-R model of Equation (1), the relationship between Q and R for the first encoding pass and the second encoding pass may be determined using equations, $$Q_{one,Ff,picType}(i) = -\alpha_{one,Ff,picType}(i) \times \log_2 R_{one,Ff,picType}(i) + \beta_{one,Ff,picType}(i), \text{ and} \quad \text{Equation (7)}$$

$$Q_{two,Ff,picType}(i) = -\alpha_{two,Ff,picType}(i) \times \log_2 R_{two,Ff,picType}(i) + \beta_{two,Ff,picType}(i) \quad \text{Equation (8)}$$

If the first encoding pass and the second encoding pass maintain a same picture type of I, P or B and a same picture structure of frame or field, the $\alpha$ and $\beta$ values in the first encoding pass and the second encoding pass may be approximately equal. Therefore, using Equations (7) and (8), the QP value for the picture i of picType∈{I,P,$B_s$,B} in Ff∈{frame, field} in the second encoding pass may be determined using an equation, $$Q_{two,Ff,picType}(i) = \quad \text{Equation (9)}$$

$$Q_{one,Ff,picType}(i) - \alpha_{Ff,picType}(i) \times \log_2\left(\frac{R_{two,Ff,picType}(i)}{R_{one,Ff,picType}(i)}\right).$$

Equation (6) differs from Equation (9) in using a constant value of 6 for Equation (6) versus an adjustable α value of $\alpha_{Ff,picType}(i)$ for Equation (9), which is a function of the picture i of picType∈{I,P,$B_s$,B} in Ff∈{frame, field}. Because the α value in the Q and R model per picture may vary from scene to scene, the rate control module 105 may adaptively correct $\alpha_{Ff,picType}(i)$ along a time domain. The adaptation may be set at a picture level, at a scene level, or at instances where an adjustment is required.

According to an embodiment, given a current picture i of picType∈{I,P,$B_s$,B} in Ff∈{frame, field} a global QP value may be determined using Equation (9).

At step 204, the second encoding module 103 encodes the input picture sequence using Q. For each picture in the second encoding pass Q is determined as $Q_{two,Ff,picType}(i)$ in Equation (9) hereinabove. The second encoding module 103 uses $Q_{two,Ff,picType}(i)$ to encode the picture, resulting in an output bitstream 110 for the picture with a rate of $\overline{R}_{two,Ff,picType}(i)$.

At step 205, the rate control module 105 updates α to encode a next picture in the second encoding pass. The rate control module 105 may update the α value using an equation $$\alpha_{Ff,picType}(i+1) = -\frac{Q_{two,Ff,picType}(i) - Q_{one,Ff,picType}(i)}{\log_2 \overline{R}_{two,FF,picType}(i) - \log_2 R_{one,Ff,picType}(i)}. \quad \text{Equation (10)}$$

The updated α is used to encode a next picture in the input video sequence 101. The initial α value may be set to 6, as shown in equation (6), or may be initialized to another value.

Figure 3:
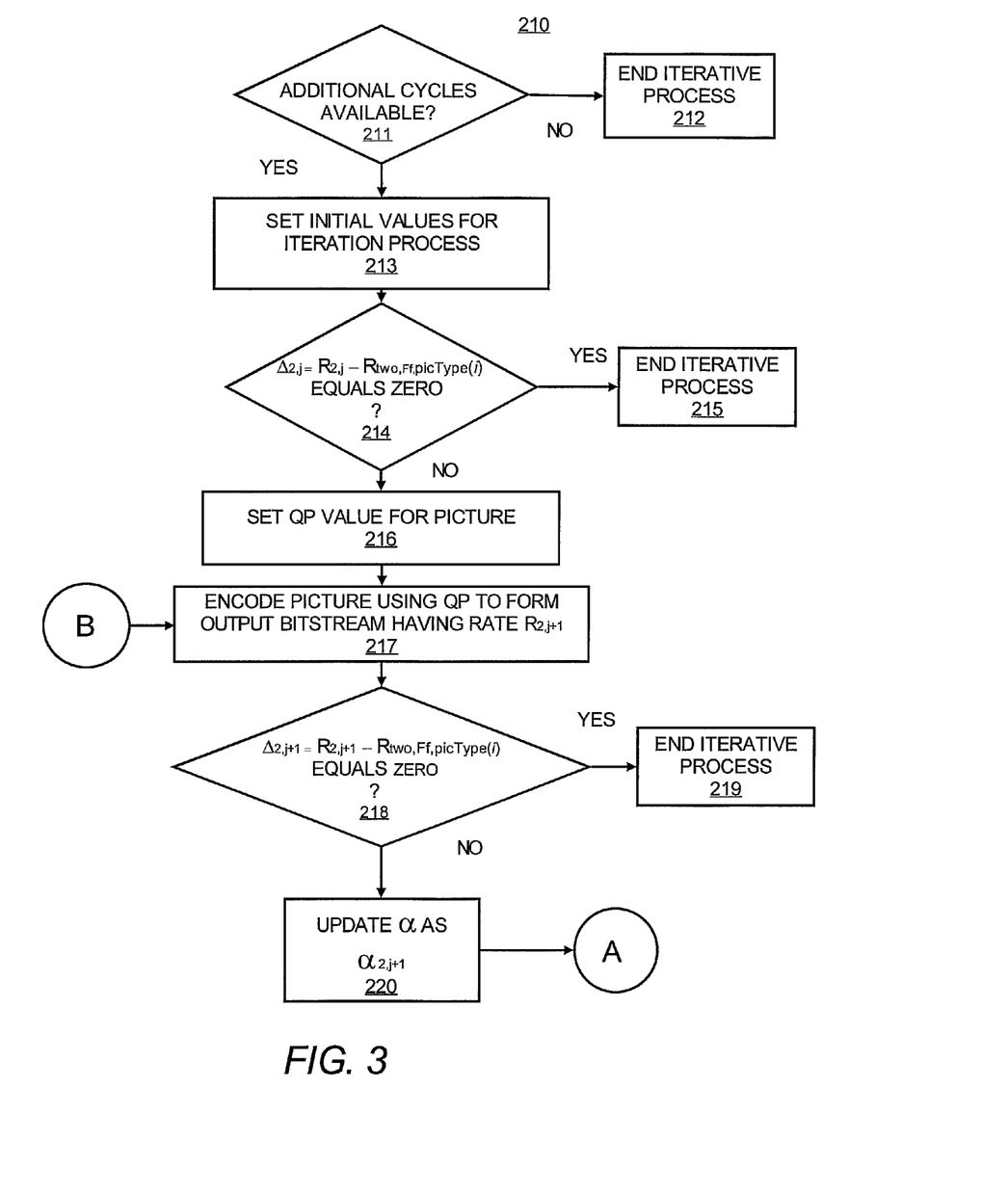
FIG. 3 illustrates a flow diagram of adjusting a quantization parameter in a two-pass encoder, according to an embodiment.
Figure 4:
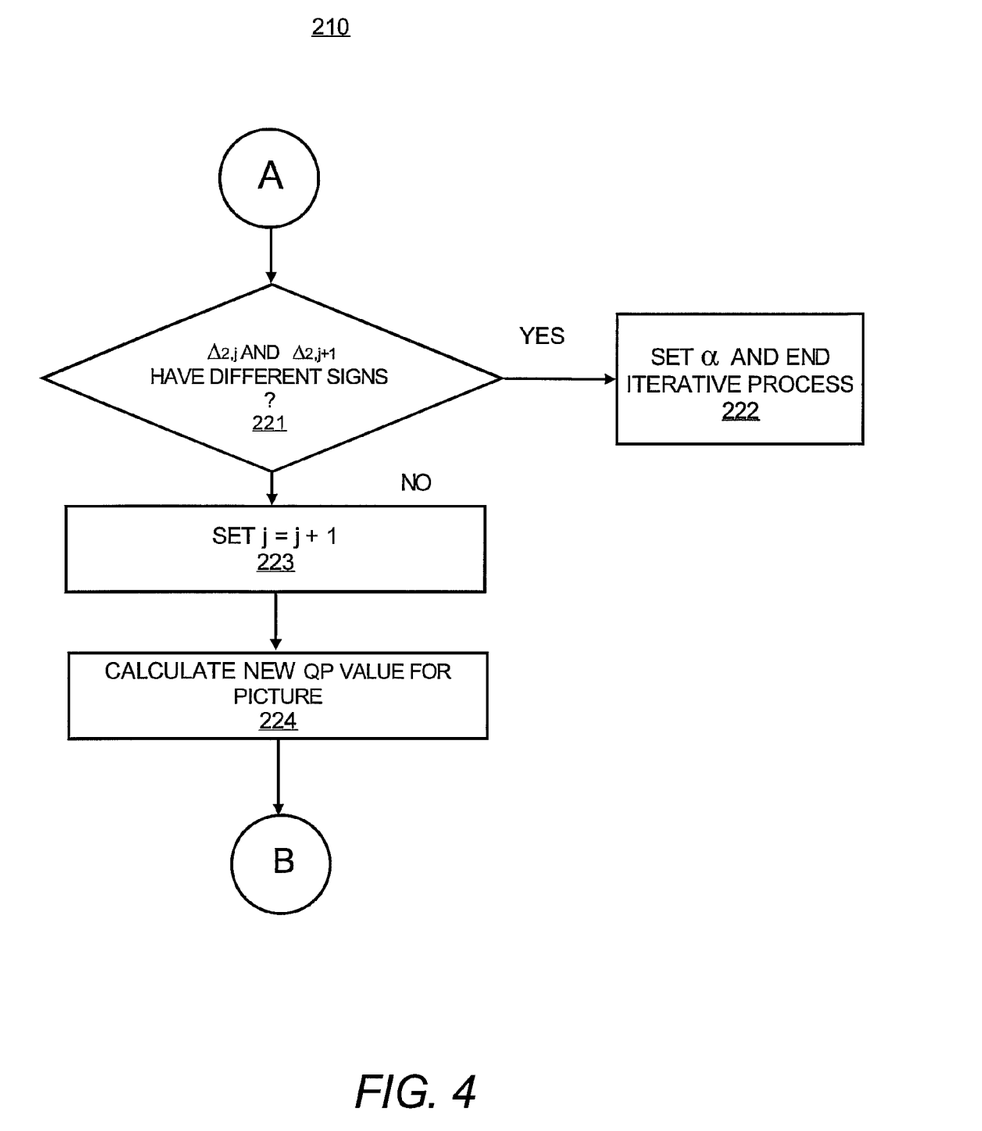
FIG. 4 illustrates a flow diagram of adjusting a quantization parameter in a two-pass encoder, according to an embodiment.

The method 210, as shown in FIGS. 3 and 4, is a generalized illustration of a method of determining whether additional processing cycles are available after implementing the encoding process for a current picture i. If additional processing cycles are available, the rate control module 105 may perform an iterative process of updating α within the current picture i. In the iterative process, the rate control module 105 calculates a new global QP value using the α value derived from a previous picture, applies the new global QP value to the current picture i, resulting in an output rate for the current picture i. The rate control module 105 then updates the α value using the resulting output rate. The updated α value is applied to the current picture i again, resulting in a new output rate for the current picture i. The new output rate should be closer to the target rate for the current picture i than the previous output rate. Or the updated α value is a better fit for the current picture i. The iterative process is repeated until the updated α value results in a QP value with a rate closest to the target rate.

At step 211, as shown in FIG. 3, the rate control module 105 determines if additional processing cycles are available. If the rate control module 105 determines that additional processing cycles are not available, the rate control module 105 ends the iterative process at step 212.

At step 213, if the rate control module 105 determines that additional processing cycles are available, the rate control module 105 may perform the iterative process in updating α for the current picture i in the second encoding pass. According to an embodiment, for the current picture i with a given target rate, $R_{two,Ff,picType}(i)$, to begin the iterative process, the rate control module 105 is configured to set an initial iteration index j=0 along with an initial α value $\alpha_{2,j}=\alpha_{Ff,picType}(i)$ derived from a picture immediately preceding the current picture of the same type, an initial QP value $Q_{2,j}=Q_{two,Ff,picType}(i)$ calculated using the initial value $\alpha_{2,j}=$ $\alpha_{Ff,picType}(i)$, and an initial output rate $R_{2,j}=\overline{R}_{two,Ff,picType}(i)$ resulting from using the initial QP value $Q_{2,j}=Q_{two,Ff,picType}(i)$.

At step 214, the rate control module 105 determines whether the output bit rate $R_{2,j}$ is equal to $R_{two,Ff,picType}(i)$, the target bit rate for a current picture i. The rate control module 105 may use an equation $$\Delta_{2,j} = R_{2,j} - R_{two,Ff,picType}(i), \quad \text{Equation (11)}$$

in which $\Delta_{2,j}$ is a difference between $R_{2,j}$ and $R_{two,Ff,picType}(i)$. The rate control module 105 determines whether $\Delta_{2,j}=0$. If $\Delta_{2,j}=0$, the rate control module 105 ends the iterative process at step 215. The initial α value is the α value for next picture. If $\Delta_{2,j}$ is not equal to 0, then at step 216, the rate control module 105 sets $Q_{2,j+1}$, in which $Q_{2,j+1}$ is a new QP value for the picture i, using an equation $$Q_{2,j+1} = \begin{cases} Q_{2,j} + 1 \\ Q_{2,j} - 1 \end{cases} \text{if} \begin{array}{l} \Delta_{2,j} > 0 \\ \Delta_{2,j} < 0. \end{array} \quad \text{Equation (12)}$$

At step 217, the second encoding module 103 encodes the picture i using $Q_{2,j+1}$ to form an output bitstream 110 with a rate of $R_{2,j+1}$. Thereafter, at step 218, the rate control module 105 determines whether the output bit rate $R_{2,j+1}$ is equal to $R_{two,Ff,picType}(i)$. The rate control may calculate a difference between $R_{2,j+1}$ and $R_{two,Ff,picType}(i)$ using an equation $$\Delta_{2,j+1} = R_{2,j+1} - R_{two,Ff,picType}(i). \quad \text{Equation (13)}$$

At step 219, if $\Delta_{2,j+1}$=the rate control module 105 ends the iterative process. At step 220, if $\Delta_{2,j+1}$ is not equal to 0, the rate control module 105 updates α using an equation $$\alpha_{2,j+1} = -\frac{Q_{2,j+1} - Q_{2,j}}{\log_2 R_{2,j+1} - \log_2 R_{2,j}}. \quad \text{Equation (14)}$$

At step 221, the rate control module 105 determines if $\Delta_{2,j+1}$ and $\Delta_{2,j}$ have different signs. If $\Delta_{2,j+1}$ and $\Delta_{2,j}$ have different signs, for instance $\Delta_{2,j+1}$ is negative and $\Delta_{2,j}$ is positive, at step 222, the rate control module 105 sets α value for next picture i+1 using an equation $$\alpha_{Ff,picType}(i+1) = \begin{cases} \alpha_{2,j+1}, & |\Delta_{2,j+1}| \le |\Delta_{2,j}| \\ \alpha_{2,j}, & |\Delta_{2,j+1}| > |\Delta_{2,j}| \end{cases}. \quad \text{Equation (15)}$$

The rate control module 105 then ends the iterative process.

At step 223, however, if $\Delta_{2,j+1}$ and $\Delta_{2,j}$ have a same sign, the rate control module 105 sets j=j+1. The rate control module 105 calculates a new QP value using a linear model to be $$Q_{2,j+1} = Q_{2,j} + \quad \text{Equation (16)}$$

$$\frac{Q_{2,j} - Q_{2,j-1}}{\log_2 R_{2,j} - \log_2 R_{2,j-1}}(\log_2 R_{two,Ff,picType}(i) - \log_2 R_{2,j}),$$

or using a non-linear model to be $$Q_{2,j+1} = Q_{2,j} - \alpha_{2,j} \times \log_2\left(\frac{R_{two,Ff,picType}(i)}{R_{2,j}}\right) \quad \text{Equation (17)}$$

and the second encoding module 103 uses the new QP value to encode the picture i at step 217 again, resulting in an output bitstream 110 with a rate of $R_{2,j+1}$.

Among all the QP values that have been used, the one with an output rate closest to the target rate is the final QP for the current picture. The α value may be updated only once per picture in one embodiment.

Figure 5:
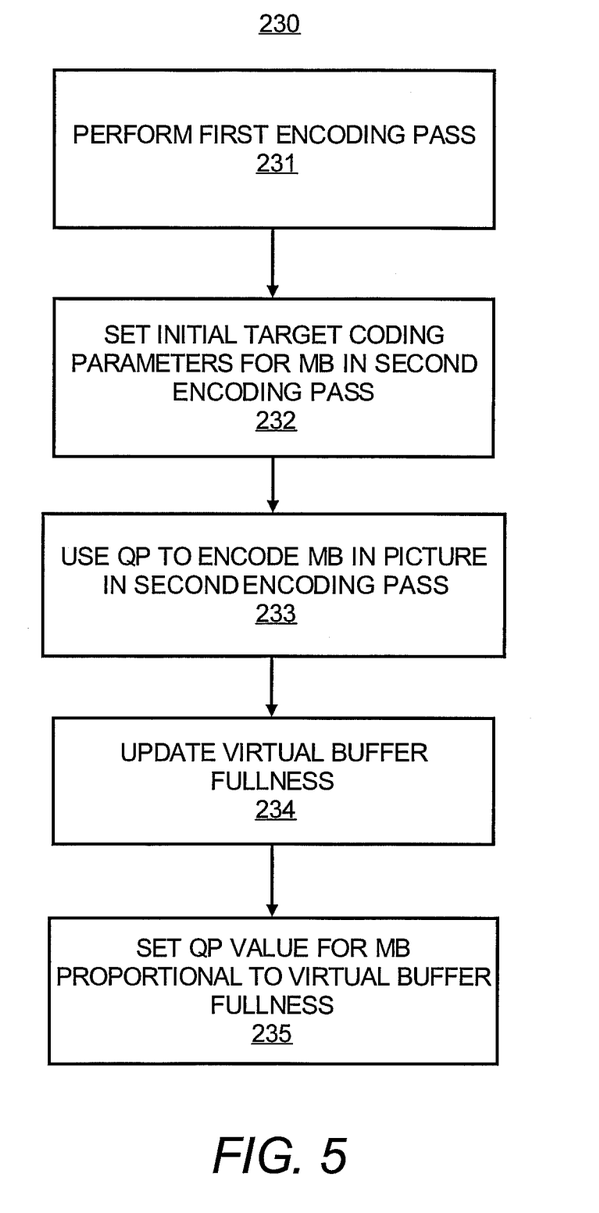
FIG. 5 illustrates a flow diagram of adjusting a quantization parameter in a two-pass encoder, according to an embodiment.

The method 230, as shown in FIG. 5, is a generalized illustration of a method of determining a QP value to control a virtual buffer fullness. The rate control module 105 adjusts a QP value per MB according to the virtual buffer fullness at each MB within a picture. The basic procedure can be used in adjusting the QP value per MB within a picture in the second encoding module 103.

At step 231, as shown in FIG. 5, the first encoding module 102 performs a first encoding pass. The first encoding module 102 may receive the input video sequence 101 including a sequence of pictures in which each picture is one of an I, P, $B_s$, or B picture in field or frame.

At step 232, the rate control module 105 sets initial target coding parameters for a current picture i in the second encoding pass. These may be predetermined parameters. For instance the rate control module 105 may set a target number of bits $R_{two,Ff,picType}(i)$, for the current picture i. The rate control module 105 may also set a QP value for a first MB with index 0 in the current picture. The rate control module may set the QP value to the picture-level QP calculated for the same current picture, using an equation $$Q(0) = Q_{two,Ff,picType}(i). \quad \text{Equation (19)}$$

Additionally, the rate control module 105 may set an initial virtual buffer fullness at the beginning of the current picture using an equation $$d(0) = \frac{\text{bit\_rate}}{51 \times \text{pic\_rate}} \times 2^{\frac{Q(0)-c}{6}}, \quad \text{Equation (20)}$$

in which bit_rate is the bit rate in bits per second, pic_rate is the picture rate in pictures per second and c is a constant equal to 4.

At step 233, the second encoding module 103 uses the QP to encode an MB in the second encoding pass. For instance, the second encoding module 103 may encode an MB with index j−1 of the current picture i. Thereafter, at step 234, the rate control module 105 updates the virtual buffer fullness using an equation $$d(j) = d(0) + B_{two}(j) - \frac{B_{one}(j)}{R_{one,Ff,picType}(i)} R_{two,Ff,picType}(i), \quad \text{Equation (21)}$$

in which $B_{one}(j)$ and $B_{two}(j)$ are, respectively, the number of bits generated from coding the current picture up to MB j in the first encoding pass and the second encoding pass.

At step 235, the rate control module 105 then sets the QP value for MB j of the current picture i in the second encoding pass proportional to the fullness of virtual buffer using an equation $$Q(j) = [6 \times \log_2(51 \times (\text{pic\_rate}/\text{bit\_rate}) \times d(j)) + c]. \quad \text{Equation (22)}$$

The QP value is adjusted based upon the virtual buffer fullness. Therefore, it is possible that identical MBs may be assigned different QP values, resulting in non-uniform picture quality. The method 230 is repeated to encode each MB in the picture and for subsequent pictures.

Figure 6:
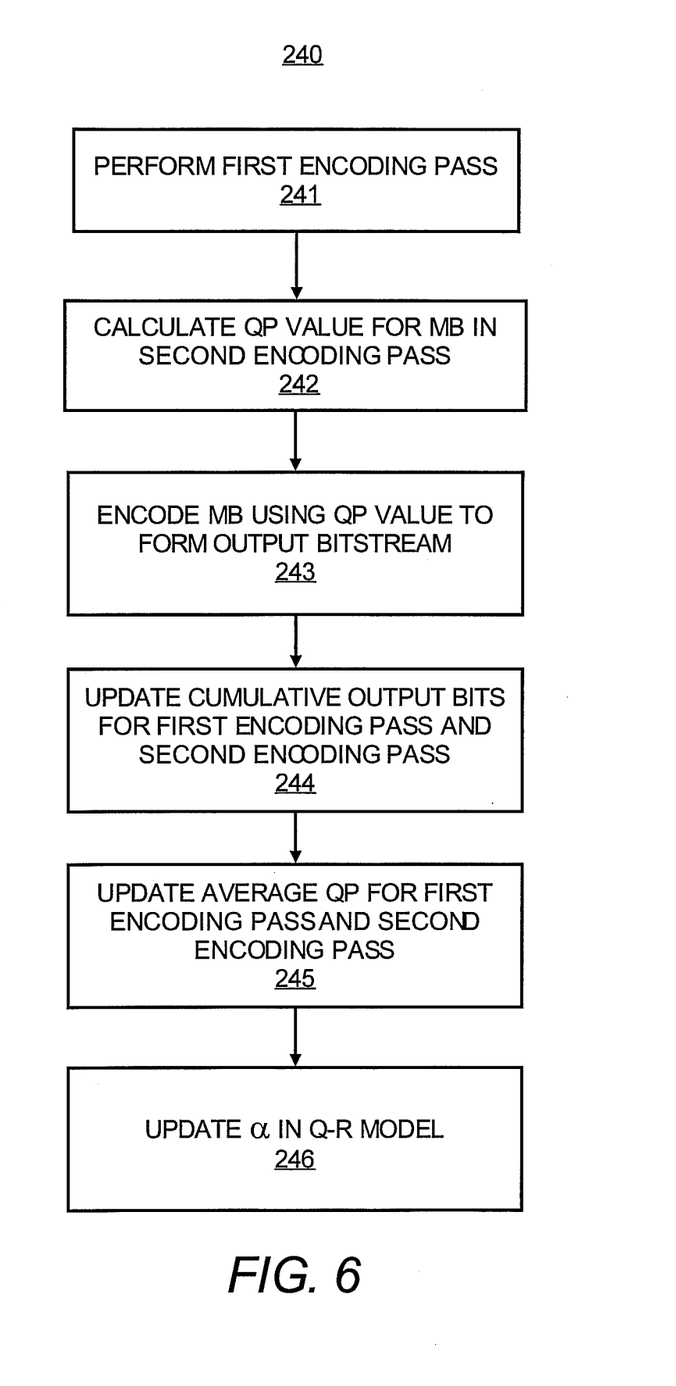
FIG. 6 illustrates a flow diagram of adjusting a quantization parameter in a two-pass encoder, according to an embodiment.

The method 240, as shown in FIG. 6, is a generalized illustration of a method of determining Q per MB based on a Q-R model represented by Equation (1). The rate control module 105 may adjust the QP value per MB using Equation (1). In the method 240, the rate control module 105 updates α value in the Q-R model at an MB level, in contrast to at a picture level as shown hereinabove in the method 200.

At step 241, as shown in FIG. 6, the first encoding module 102 performs a first encoding pass.

At step 242, the rate control module 105 calculates a QP value for MB j in the second encoding pass using an equation $$q_{two,Ff,picType}(j) = \quad \text{Equation (23)}$$
$$Q_{one,Ff,picType}(i) - \alpha_{Ff,picType}(i) \times \log_2\left(\frac{R_{two,Ff,picType}(i)}{R_{one,Ff,picType}(i)}\right).$$

At step 243, the second encoding module 103 uses $q_{two,Ff,picType}(i)$ to encode MB j in the second encoding pass. The second encoding module 103 outputs the output bitstream 110 at a rate of $r_{two,Ff,picType}(j)$. Given a current MB j of the picture i of picType∈{I,P,$B_s$,B} in Ff∈{frame, field}, the QP value and the new α value are calculated as follows.

At step 244, the rate control module 105 updates cumulative output bits for both the first encoding pass and the second encoding pass using an equation $$\begin{cases} \tilde{r}_{one,Ff,picType}(j+1) = \tilde{r}_{one,Ff,picType}(j) + r_{one,Ff,picType}(j) \\ \tilde{r}_{two,Ff,picType}(j+1) = \tilde{r}_{two,Ff,picType}(j) + r_{two,Ff,picType}(j) \end{cases}, \quad \text{Equation (24)}$$

in which $\tilde{r}_{one,Ff,picType}(j)$ and $\tilde{r}_{two,Ff,picType}(j)$ are respectively the cumulative coded bits up to MB j for the first encoding pass and the second encoding pass.

At step 245, the rate control module 105 updates average QP values for both the first encoding pass and the second encoding pass using an equation $$\begin{cases} \bar{q}_{one,Ff,picType}(j+1) = \dfrac{\bar{q}_{one,Ff,picType}(j) \times j + q_{one,Ff,picType}(j)}{j+1} \\ \bar{q}_{two,Ff,picType}(j+1) = \dfrac{\bar{q}_{two,Ff,picType}(j) \times j + q_{two,Ff,picType}(j)}{j+1} \end{cases}, \quad \text{Equation (25)}$$

in which $\bar{q}_{one,Ff,picType}(j)$ and $\bar{q}_{two,Ff,picType}(j)$ are corresponding average QP values per MB used up to MB j for the first encoding pass and the second encoding pass, respectively.

At step 246, the rate control module 105 updates the α value in the Q-R model using an equation $$\alpha_{Ff,picType}(i) = -\frac{\bar{q}_{two,Ff,picType}(j+1) - \bar{q}_{one,Ff,picType}(j+1)}{\log_2 \tilde{r}_{two,Ff,picType}(j+1) - \log_2 \tilde{r}_{one,Ff,picType}(j+1)} \quad \text{Equation (26)}$$

The initial α value can be set to 6, as shown in Equation (6), or any other reasonable value. In the case of MBAFF, $\alpha_{Ff,picType}(i)$ is updated per MB pair. $\tilde{r}_{one,Ff,picType}(j)$, $\tilde{r}_{two,Ff,picType}(j)$, $\bar{q}_{one,Ff,picType}(j)$ and $\bar{q}_{two,Ff,picType}(j)$ are updated using the final selected frame or field data. In order to avoid possible initial fluctuation, $q_{two,Ff,picType}(i)$ and $\alpha_{Ff,picType}(i)$ can be calculated/updated based upon the average historical data (i.e. $\tilde{r}_{one,Ff,picType}(j)$, $\tilde{r}_{two,Ff,picType}(j)$, $\overline{q}_{one,Ff,picType}(j)$ and $\overline{q}_{two,Ff,picType}(j)$) over a moving window of a number of MBs. In this way, there will be no need to reset the MB cumulative bits and average QP value at each picture, and the statistics should be stable. The method 240 is repeated to encode each MB in the picture and for subsequent pictures.

Figure 7:
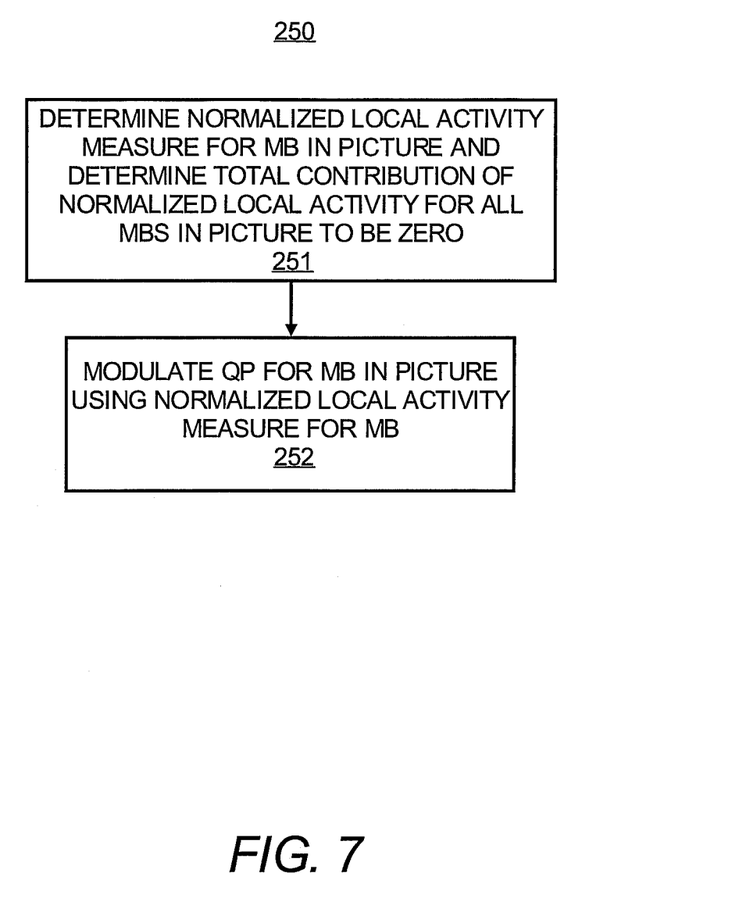
FIG. 7, illustrates a flow diagram of modulating a quantization parameter in a two-pass encoder, according to an embodiment.

The method 250, as shown in FIG. 7, is a generalized illustration of a method of further modulating a QP value for an MB j of a picture i by a corresponding MB-level spatial local activity for a better subjective quality. The QP value may be determined as in any of the methods 200 to 240 hereinabove.

At step 251, the rate control module 105 determines $\Delta QP_j(i)$. $\Delta QP_j(i)$ is a normalized local activity measure for MB j in the picture i. The rate control module 105 also determines the total contribution of the normalized local activities for all MBs in the picture i to be equal to zero. The rate control module 105 may determine this condition using an equation, $$\sum_j \Delta QP_j(i) = 0. \quad \text{Equation (31)}$$

According to an embodiment, the rate control module 105 determines $act_j(i)$, $avg\_act(i)$, and $N_{MB}$. $act_j(i)$ is a spatial local activity measure for MB j of the picture i, $avg\_act(i)$ is an average spatial local activity of the picture i, and $N_{MB}$ is the total number of MBs for the picture i. $avg\_act(i)$ may be defined by equations, $$avg\_act(i) = \frac{1}{N_{MB}} \Sigma_j act_j(i), \quad \text{Equation (27)}$$

$$avg\_act(i) = \text{median}\{act_j(i)\}, \quad \text{Equation (28)}$$

$$avg\_act(i) = \sqrt[N_{MB}]{\Pi_j act_j(i)}. \quad \text{Equation (29)}$$

Thereafter, the rate control module 105 determines $\Delta QP_j(i)$ using an equation $$\Delta QP_j(i) = 6 \times \left( \begin{array}{l} \log_2\left(\frac{\beta \times act_j(i) + avg\_act(i)}{act_j(i) + \beta \times avg\_act(i)}\right) - \\ \frac{1}{N_{MB}} \sum_j \log_2\left(\frac{\beta \times act_j(i) + avg\_act(i)}{act_j(i) + \beta \times avg\_act(i)}\right) \end{array} \right).$$

in which $\beta$ is a variable controlling the range of the local activity range. $\beta$ may be, for example, set to a value of 2.

At step 252, the rate control module 105 modulates $QP_j(i)$ by the normalized local activity measure $\Delta QP_j(i)$. $QP_j(i)$ is the QP value for MB j of the picture i. The rate control may determine a final QP value for MB(j) by modulating $QP_j(i)$ by a normalized local activity as $$QP_j(i) = QP_j(i) + \Delta QP_j(i). \quad \text{Equation (30)}$$

The final $QP_j(i)$ may need to be further clipped into an allowable QP value range of [0, 51].

6. Architecture of Encoding Modules in a Two-Pass MPEG-4 AVC Encoder

Figure 8:
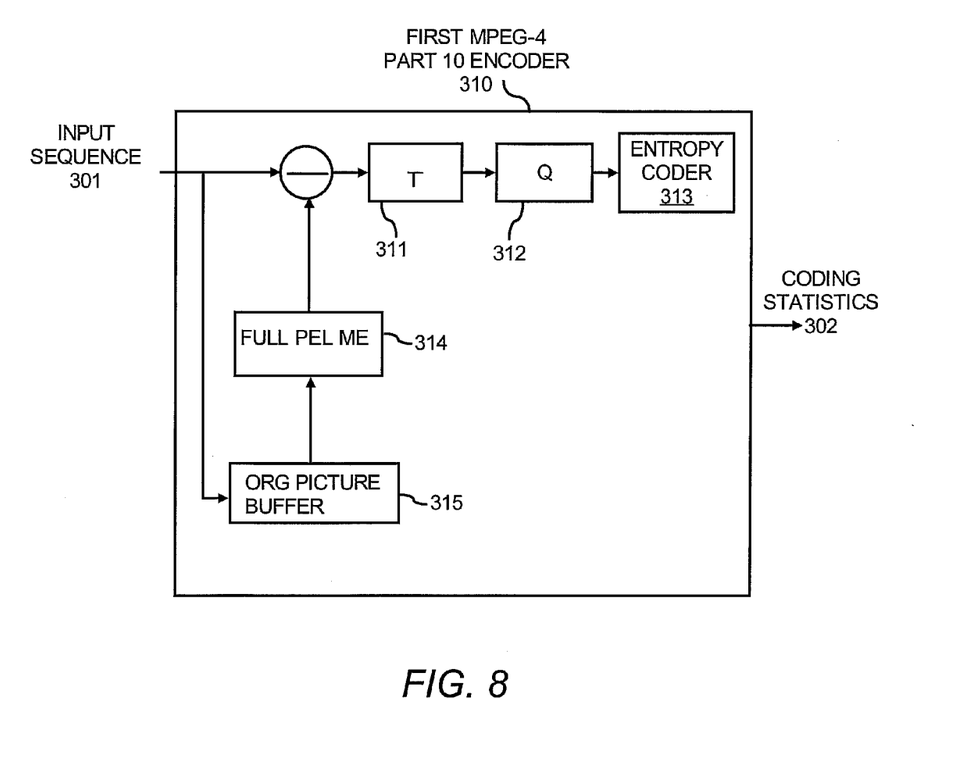
FIG. 8 illustrates a simplified block diagram of a first encoding module, according to an embodiment.
Figure 9:
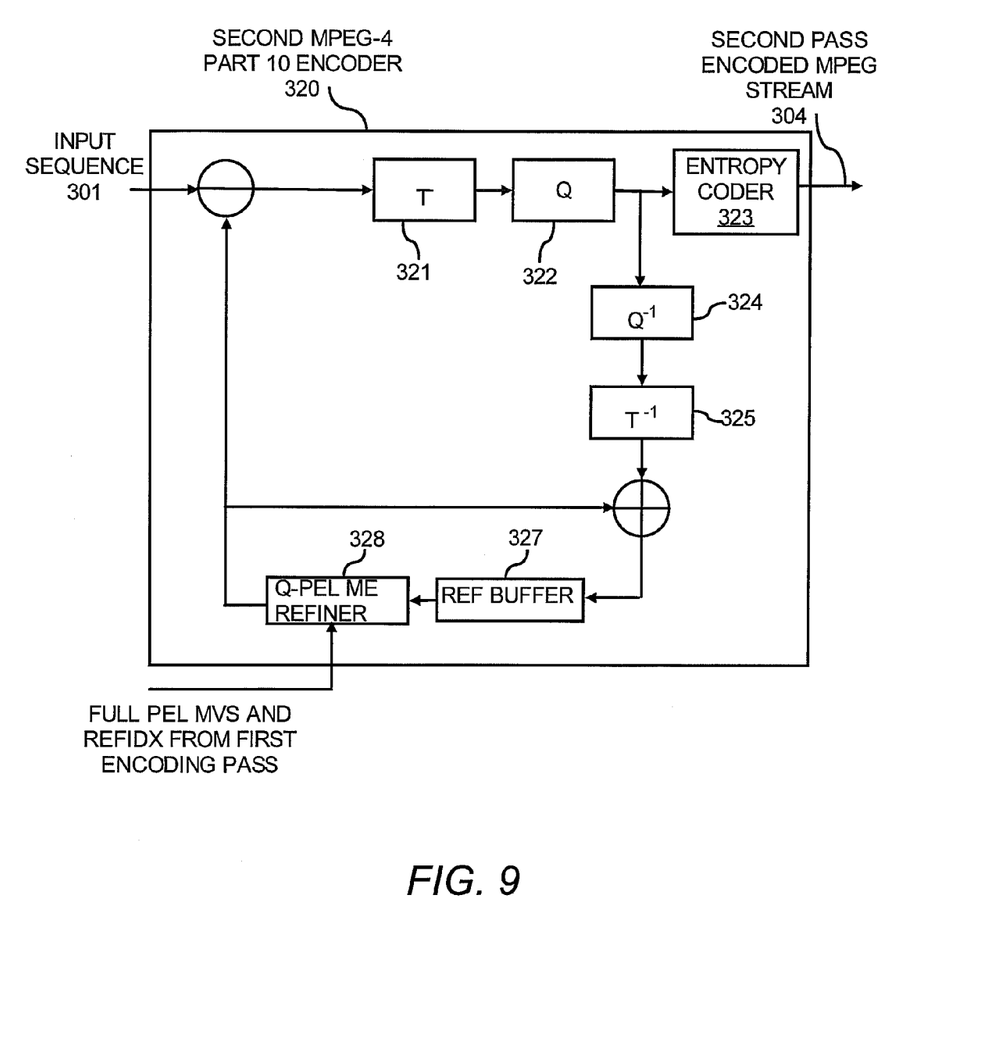
FIG. 9 illustrates a simplified block diagram of a second encoding module, according to an embodiment.

FIGS. 8 and 9 illustrate respectively simplified block diagrams of architectures of a first MPEG-4 AVC encoding module 310 and a second MPEG-4 AVC encoding module 320. The first MPEG-4 AVC encoding module 310 and the second MPEG-4 AVC encoding module 320 may be used in a two-pass MPEG-4 AVC encoder, for instance the two-pass MPEG-4 AVC encoder 100, in which the methods 200-250 as described with respect to FIGS. 2 to 7 hereinabove may be implemented. As shown in FIG. 1, the two-pass MPEG-4 AVC encoder 100 may include the first MPEG-4 AVC encoding module 310 and the second MPEG-4 AVC encoding module 320. The two-pass MPEG-4 AVC encoder 100 may be configured to encode an input video sequence 301 using a first encoding pass using the first MPEG-4 AVC encoding module 310. The second MPEG-4 AVC encoding module 320 performs a second encoding pass approximately in parallel with the first encoding pass performed by the first MPEG-4 AVC encoding module 310 with an offset provided by a delay. The second MPEG-4 AVC encoding module 320 encodes the input sequence 301 with a delay and outputs a second pass encoded MPEG stream 304. Coding statistics 302 from the first encoding pass may be used to calculate target coding parameters for the second encoding pass.

Both the first MPEG-4 AVC encoding module 310 and the second MPEG-4 AVC encoding module 320 include a circuit, for instance a processor executing computer code stored on a computer readable storage device, a memory, or an application specific integrated circuit (ASIC) configured to implement or execute one or more of the processes required to encode an input video sequence to generate an MPEG-4 AVC stream depicted in FIGS. 2-7. It should be understood that the first MPEG-4 AVC encoding module 310 and the second MPEG-4 AVC encoding module 320 depicted in FIGS. 8 and 9 may include additional components and that some of the components described herein may be removed and/or modified without departing from a scope of the first MPEG-4 AVC encoding module 310 and the second MPEG-4 AVC encoding module 320.

The first MPEG-4 AVC encoding module 310 and the second MPEG-4 AVC encoding module 320 may comprise MPEG-4 AVC encoders. The first MPEG-4 AVC encoding module 310, and similarly the second MPEG-4 AVC encoding module 320, includes components that may be used to generate an MPEG-4 AVC stream. For instance, the first MPEG-4 AVC encoding module 310 may include a transformer 311, a quantizer 312, an entropy coder 313, a full-pel ME 314, and an org picture buffer 315.

By way of example, as shown in FIG. 8 with respect to the first MPEG-4 AVC encoding module 310, the transformer 311 is a block transform. The block transform is an engine that converts a block of pixels in the spatial domain into a block of coefficients in the transform domain. The block transform tends to remove the spatial correlation among the pixels of a block. The coefficients in the transform domain are thereafter highly decorrelated. The quantizer 312 assigns coefficient values into a finite set of values. Quantization is a lossy operation and the information lost due to quantization cannot be recovered. The entropy coder 313 performs entropy coding, a lossless coding procedure which further removes statistical redundancy in the quantized transform coefficients. The full-pel ME 314 performs full-pel ME which generates MVs and associated reference index per block, and the org pic buffer 315, holds pictures during the first encoding pass.

By way of example, as shown in FIG. 9, the second MPEG-4 AVC encoding module 320 may include similar components configured to perform similar processes as those used in the first MPEG-4 AVC encoding module 310. In addition, the second MPEG-4 AVC encoding module 320 may include a dequantizer 324 that is configured to perform an inverse quantization operation and an inverse transformer 325. The inverse transformer 325 is configured to perform a reverse transform, for instance from a block of coefficients in the transform domain to a block of pixels in the spatial domain.

As described above, the embodiments utilize a two-pass encoder, and rate control is improved by adjusting a QP value to meet the target bit rate for encoding the pictures in the second encoding pass. The QP value may be adjusted at a picture level or a macroblock level. Further, the QP value may be adjusted so that an actual bit rate closely approximates a target bit rate. Alternately, the QP value may be adjusted to constrain a bit rate within a virtual buffer based on a virtual buffer fullness.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention. Also, the methods and system described herein are described with respect to encoding video sequences using MPEG-4 AVC by way of example. The methods and systems may be used to encode video sequences using other types of MPEG standards or standards that are not MPEG.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A two-pass encoder to determine a quantization parameter (QP) value to control an actual number of bits consumed in a second encoding pass, the two-pass encoder comprising:
   a first encoding module including a circuit configured to perform a first encoding pass to encode an input video sequence;
   a rate control module configured to
      determine R, wherein R is a target bit rate for encoding a picture i in the input video sequence in a second encoding pass,
      determine Q based on R and $\alpha$, wherein $\alpha$ is a variable dependent on a QP value range, a picture type, and complexity, and Q is a QP value for the picture i or an MB of the picture i in the second encoding pass;
   a second encoding module configured to use Q to encode the picture i or the macroblock (MB) of the picture i in the second encoding pass to form an output bitstream; and
   wherein the rate control module is further configured to update $\alpha$ to encode a next picture or a next MB of the picture in the input video sequence for a further implementation of the second encoding pass, and
   wherein the rate control module is configured to determine Q based on a Q-R modeling equation represented by $Q = -\alpha \times \log_2 R + \beta$, wherein $\beta$ is adjusted for the QP value ranges, the picture type, and the complexity.

2. The two-pass encoder of claim 1, wherein the rate control module determines Q for the picture i based on the Q-R modeling equation.

3. The two-pass encoder of claim 2, wherein Q is $Q_{two,Ff,picType}(i)$ and the rate control module is configured to calculate $$Q_{two,Ff,picType}(i) = Q_{one,Ff,picType}(i) - \alpha_{Ff,picType}(i) \times \log_2\left(\frac{R_{two,Ff,picType}(i)}{R_{one,Ff,picType}(i)}\right),$$

wherein $Q_{one,Ff,picType}(i)$ is a QP value of the picture i in the first encoding pass, $R_{one,Ff,picType}(i)$ is an actual number of bits used to encode the picture i in the first encoding pass, and $R_{two,Ff,picType}(i)$ is a target number of bits for the picture i in the second encoding pass.

4. The two-pass encoder of claim 3, wherein $\alpha$ is $\alpha_{Ff,picType}(i+1)$ and the rate control module is configured to:
   update $$\alpha_{Ff,picType}(i+1) = -\frac{Q_{two,Ff,picType}(i) - Q_{one,Ff,picType}(i)}{\log_2 \bar{R}_{two,FF,picType}(i) - \log_2 R_{one,Ff,picType}(i)}.$$

5. The two-pass encoder of claim 3, wherein the rate control module is further configured to:
   determine whether additional processing cycles are available; and
   if additional processing cycles are available, perform an iterative process of updating $\alpha$.

6. The two-pass encoder of claim 5, wherein to perform the iterative process, the rate control module is configured to:
   set
      j=0,
      $\alpha_{2,j} = \alpha_{Ff,picType}(i)$, wherein $\alpha_{2,j}$ is a value of $\alpha$ at the picture i with a target number of bits $R_{two,Ff,picType}(i)$
      $Q_{2,j} = Q_{two,Ff,picType}(i)$, and
      $R_{2,j} = \bar{R}_{two,Ff,picType}(i)$, wherein $R_{2,j}$ is an output bit rate of the second encoding pass for the picture i using $Q_{2,j}$;
   calculate $\Delta_{2,j} = R_{2,j} - R_{two,Ff,picType}(i)$, wherein $\Delta_{2,j}$ is a difference between $R_{2,j}$ and $R_{two,Ff,picType}(i)$;
   determine whether $\Delta_{2,j} = 0$;
   if $\Delta_{2,j}$ is not equal to 0, set $Q_{2,j+1}$, wherein $Q_{2,j+1}$ is a new QP value for the picture i to be $$Q_{2,j+1} = \begin{cases} Q_{2,l} + 1 & \text{if } \Delta_{2,j} > 0 \\ Q_{2,l} - 1 & \Delta_{2,j} < 0; \end{cases}$$

encode the picture i using $Q_{2,j+1}$ to form an output bitstream with a rate of $R_{2,j+1}$; and
   calculate a difference between $R_{2,j+1}$ and $R_{two,Ff,picType}(i)$ to be $\Delta_{2,j+1} = R_{2,j+1} - R_{two,Ff,picType}(i)$;
   if $\Delta_{2,j+1}$ is not equal to 0, update $\alpha$ to be $$\alpha_{2,j+1} = -\frac{Q_{2,j+1} - Q_{2,j}}{\log_2 R_{2,j+1} - \log_2 R_{2,j}};$$

and
   if $\Delta_{2,j+1}$ and $\Delta_{2,j}$ have different signs, set $\alpha$ value for next picture i+1 to be $$\alpha_{Ff,picType}(i+1) = \begin{cases} \alpha_{2,j+1}, & |\Delta_{2,j+1}| \leq |\Delta_{2,j}| \\ \alpha_{2,j}, & |\Delta_{2,j+1}| > |\Delta_{2,j}|. \end{cases}$$

7. The two-pass encoder of claim 1, wherein the rate control module determines Q per MB j of the picture i based on the Q-R modeling equation.

8. The two-pass encoder of claim 7, wherein the rate control module is configured to determine $$q_{two,Ff,picType}(j) = Q_{one,Ff,picType}(i) - \alpha_{Ff,picType}(i) \times \log_2\left(\frac{R_{two,Ff,picType}(i)}{R_{one,Ff,picType}(i)}\right),$$

wherein $q_{two,Ff,picType}(j)$ is a QP value for the MB j
use $q_{two,Ff,picType}(j)$ to encode MB j at a bit rate of $r_{two,Ff,picType}(j)$;
update cumulative output bits for the first encoding pass and the second encoding pass equal to, $$\begin{cases} \tilde{r}_{one,Ff,picType}(j+1) = \tilde{r}_{one,Ff,picType}(j) + r_{one,Ff,picType}(j) \\ \tilde{r}_{two,Ff,picType}(j+1) = \tilde{r}_{two,Ff,picType}(j) + r_{two,Ff,picType}(j); \end{cases}$$

update average QP value in the first encoding pass and the second encoding pass equal to, $$\begin{cases} \bar{q}_{one,Ff,picType}(j+1) = \frac{\bar{q}_{one,Ff,picType}(j) \times j + q_{one,Ff,picType}(j)}{j+1} \\ \bar{q}_{two,Ff,picType}(j+1) = \frac{\bar{q}_{two,Ff,picType}(j) \times j + q_{two,Ff,picType}(j)}{j+1}; \end{cases}$$

and
update $\alpha$ in the Q-R modeling equation to $$\alpha_{Ff,picType}(i) = -\frac{\bar{q}_{two,Ff,picType}(j+1) - \bar{q}_{one,Ff,picType}(j+1)}{\log_2 \tilde{r}_{two,Ff,picType}(j+1) - \log_2 \tilde{r}_{one,Ff,picType}(j+1)}.$$

9. The two-pass encoder of claim 8, wherein the rate control module is configured to update $\alpha$ for each MB pair in a MB adaptive frame field (MBAFF).

10. The two-pass encoder of claim 7, wherein the rate control module is further configured to:
determine $\Delta QP_j(i)$, wherein is a normalized local activity measure for an MB j in the picture i; and
modulate Q, the QP value for the MB j of the picture i, using $\Delta QP_j(i)$.

11. The two-pass encoder of claim 10, wherein $$\Delta QP_j(i) = 6 \times \left( \log_2\left(\frac{\beta \times act_j(i) + avg\_act(i)}{act_j(i) + \beta \times avg\_act(i)}\right) - \frac{1}{N_{MB}} \sum_j \log_2\left(\frac{\beta \times act_j(i) + avg\_act(i)}{act_j(i) + \beta \times avg\_act(i)}\right) \right),$$

$\beta$ is a variable controlling the range of the local activity, $act_j(i)$ is a spatial local activity measure for MB j of the picture i, $avg\_act(i)$ is an average spatial local activity of the picture i, and $N_{MB}$ is the total number of MBs for the picture i and $$\sum_j \Delta QP_j(i) = 0.$$

12. A two-pass encoder to determine a quantization parameter (QP) value to control a virtual buffer fullness, the two-pass encoder comprising:

a first encoding module including a circuit configured to perform a first encoding pass to encode a current picture i in the input video sequence;
a rate control module configured to determine a target bit rate for the current picture i in a second encoding pass, and determine a QP value for an macroblock (MB) j of the current picture i based on the target bit rate and the virtual buffer fullness;
a second encoding module configured to use the QP value to encode the MB j in the current picture i in the input video sequence in the second encoding pass to form an output bitstream; and
wherein the rate control module is further configured to update the virtual buffer fullness based on a number of bits generated from encoding the current picture i up to MB j to encode a next MB j+1 for a further implementation of the second encoding pass, and
wherein after the second encoding module encodes an MB with index j−1 of the current picture i, the rate control module is configured to update the virtual buffer fullness to $$d(j) = d(0) + B_{two}(j) - \frac{B_{one}(j)}{R_{one,Ff,picType}(i)} R_{two,Ff,picType}(i),$$

wherein $B_{one}(j)$ is a number of bits generated from encoding the current picture i up to MB j in the first encoding pass, and $B_{two}(j)$ is a number of bits generated from encoding the current picture i up to MB j in the second encoding pass.

13. The two-pass encoder of claim 12 wherein the rate control module is configured to determine Q(j) based on a Q-R modeling equation represented by $Q(j)=-\alpha \times \log_2 R + \beta$, wherein $\beta$ is adjusted for the QP value ranges, the picture type, and the complexity; and
wherein the rate control module is configured to update Q(j), wherein Q(j) is a QP value for MB j of the current picture i in the second encoding pass, to be proportional to the virtual buffer fullness $$Q(j)=[6 \times \log_2(51 \times (pic\_rate/bit\_rate) \times d(j)) + c].$$

14. The two-pass encoder of claim 13, wherein the rate control module is configured to
determine $R_{two,Ff,picType}(i)$, wherein $R_{two,Ff,picType}(i)$ is a target number of bits for the current picture i in the second encoding pass;
set Q(0), wherein Q(0) is a QP value for a first MB with index 0 in the current picture i in the second encoding pass to be
$Q(0)=Q_{two,Ff,picType}(i)$, wherein $Q_{two,Ff,picType}(i)$ is a picture level QP calculated for the current picture i; and
set d(0), wherein d(0) is an initial virtual buffer fullness at the current picture i to be $$d(0) = \frac{bit\_rate}{51 \times pic\_rate} \times 2^{\frac{Q(0)-c}{6}},$$

wherein bit_rate is a bit rate in bits per second, pic_rate is a picture rate in pictures per second and c is a constant equal to 4.

15. A method of determining a quantization parameter (QP) value to control an actual number of bits consumed in a second encoding pass of a two-pass encoder, the method comprising:
- performing a first encoding pass to encode an input video sequence;
- determining R, wherein R is a target bit rate for a picture i in the input video sequence in a second encoding pass;
- determining Q based on R and α, wherein α is a variable dependent on a QP value range, a picture type, and complexity, and Q is a QP value for the picture i or an MB of the picture i in the second encoding pass;
- using Q to encode the picture i or the macroblock (MB) of the picture i in the second encoding pass to form an output bitstream; and
- updating α to encode a next picture or next MB of the picture i in the input video sequence for a further implementation of the second encoding pass,
- wherein the Q is determined based on a Q-R modeling equation represented by $Q=-\alpha \times \log_2 R+\beta$, wherein β is adjusted for the QP value ranges, the picture type, and the complexity, wherein the complexity is for the picture i.

16. The method of claim 15, wherein the Q is determined for the picture i based on the Q-R modeling equation.

17. The method of claim 16, wherein Q is $Q_{two,Ff,picType}(i)$, the method comprising:
calculating $$Q_{two,Ff,picType}(i) = Q_{one,Ff,picType}(i) - \alpha_{Ff,picType}(i) \times \log_2\left(\frac{R_{two,Ff,picType}(i)}{R_{one,Ff,picType}(i)}\right),$$

wherein $Q_{two,Ff,picType}(i)$ is a QP value of the picture i in the first encoding pass, $R_{two,Ff,picType}(i)$ is an actual number of bits used to encode the picture i in the first encoding pass, and $R_{two,Ff,picType}(i)$ is a target number of bits for the picture i in the second encoding pass.

18. The method of claim 17, further comprising:
- determining whether additional processing cycles are available;
- in response to a determination that additional processing cycles are available, performing an iterative process of updating α.

19. The method of claim 18, wherein iteratively updating α comprises:
setting
- j=0,
- $\alpha_{2,j}=\alpha_{Ff,picType}(i)$, wherein $\alpha_{2,j}$ is a value of α at the picture i with a target number of bits $R_{two,Ff,picType}(i)$,
- $Q_{2,j}=Q_{two,Ff,picType}(i)$, and
- $R_{2,j}=R_{two,Ff,picType}(i)$;

calculating $\Delta_{2,j}=R_{2,j}-R_{two,Ff,picType}(i)$, wherein $\Delta_{2,j}$ is a difference between $R_{2,j}$ and $R_{two,Ff,picType}(i)$;

determining whether $\Delta_{2,j}=0$;

if $\Delta_{2,j}$ is not equal to 0, setting $Q_{2,j+1}$, wherein $Q_{2,j+1}$ is a new QP value for the picture i to be $$Q_{2,j+1} = \begin{cases} Q_{2,l}+1 & \text{if } \Delta_{2,j}>0 \\ Q_{2,l}-1 & \Delta_{2,j}<0; \end{cases}$$

encoding the picture i using $Q_{2,g+1}$ to form an output bitstream with a rate of $R_{2,g+1}$; and calculating a difference between $R_{2,j+1}$ and $R_{two,Ff,picType}(i)$ to be $\Delta_{2,j+1}=R_{2,j+1}-R_{two,Ff,picType}(i)$;

if $\Delta_{2,j+1}$ is not equal to 0, updating α using an equation $$\alpha_{2,j+1} = -\frac{Q_{2,j+1}-Q_{2,j}}{\log_2 R_{2,j+1} - \log_2 R_{2,j}};$$

and if $\Delta_{2,j+1}$ and $\Delta_{2,j}$ have different signs, setting α value for next picture i+1 to be $$\alpha_{Ff,picType}(i+1) = \begin{cases} \alpha_{2,j+1}, & |\Delta_{2,j+1}| \leq |\Delta_{2,j}| \\ \alpha_{2,j}, & |\Delta_{2,j+1}| > |\Delta_{2,j}|. \end{cases}$$

20. The method of claim 15, wherein the Q is determined per MB j of the picture i based on a Q-R modeling equation.

* * * * *